US007261754B2

(12) United States Patent
Oh et al.

(10) Patent No.: US 7,261,754 B2

(45) Date of Patent: Aug. 28, 2007

(54) CYCLONE DUST COLLECTING APPARATUS FOR A VACUUM CLEANER

(75) Inventors: Jang-keun Oh, Gwangju (KR); Jung-gyun Han, Busan (KR)

(73) Assignee: Samsung Gwangju Electronics Co., Ltd., Gwangju (KR)

( * ) Notice: Subject to any disclaimer, the term of this patent is extended or adjusted under 35 U.S.C. 154(b) by 334 days.

(21) Appl. No.: 10/874,257

(22) Filed: Jun. 24, 2004

(65) Prior Publication Data

US 2005/0172585 A1 Aug. 11, 2005

(30) Foreign Application Priority Data

Feb. 11, 2004 (KR) ..................... 10-2004-0009090

(51) Int. Cl.
*B01D 45/12* (2006.01)

(52) U.S. Cl. ............................ 55/343; 55/346; 55/426; 55/429; 55/459.1; 55/DIG. 3

(58) Field of Classification Search .................. 55/343, 55/346, 349, 426, 429, 459.1, DIG. 3
See application file for complete search history.

(56) References Cited

U.S. PATENT DOCUMENTS

| | | | | |
|---|---|---|---|---|
| 3,425,192 | A | 2/1969 | Davis | |
| 4,826,515 | A | 5/1989 | Dyson | |
| 5,078,761 | A | 1/1992 | Dyson | |
| 5,160,356 | A | 11/1992 | Dyson | |
| 6,582,489 | B2 | 6/2003 | Conrad | |
| 2006/0123590 | A1* | 6/2006 | Fester et al. .................. | 15/353 |

FOREIGN PATENT DOCUMENTS

| | | |
|---|---|---|
| DE | 203 06 405 U1 | 10/2003 |
| DE | 101 10 581 C2 | 11/2003 |
| ES | 2105467 | 10/1997 |
| ES | 2196837 | 12/2003 |
| GB | 2 317 122 | 3/1998 |
| GB | 2 317 122 A | 3/1998 |
| GB | 2 326 360 | 12/1998 |
| GB | 2 376 176 A | 12/2002 |
| JP | 52-14775 | 8/1993 |
| JP | 2002-326041 | 11/2002 |
| WO | WO 01/60524 A1 | 8/2001 |

OTHER PUBLICATIONS

Spanish Office Action, dated Apr. 6, 2006.
Russian Patent Office; Office Action issued Jun. 30, 2005 in connection with corresponding Application No. 2004121796.

(Continued)

*Primary Examiner*—Robert Hopkins
(74) *Attorney, Agent, or Firm*—Blank Rome LLP

(57) ABSTRACT

A cyclone dust collecting apparatus for a vacuum cleaner comprises a cyclone body having a first cyclone and a second cyclone, an air inlet and an air outlet connected to the cyclone body, and a dust receptacle connected to the cyclone body. The dust receptacle includes a receptacle body and a partition member. The partition member is mounted on an inner circumference of the dust receptacle, and divides the inside of the dust receptacle into an upper and a lower dust collecting chambers. The lower dust collecting chamber is formed larger than the upper dust collecting chamber.

10 Claims, 4 Drawing Sheets

OTHER PUBLICATIONS

British Patent Office Combined Search and Examination Report issued Nov. 25, 2004 in connection with the corresponding application No. 0415463.9.

Canadian Patent Office, Office Action issued Sep. 6, 2006, with respect to Canadian Patent Application No. 2,472,673, filed Jun. 29, 2004.

German Patent Office, Office Action issued Aug. 8, 2006, with respect to German Patent Application No. 102004034015.3, filed on Jul. 14, 2004.

Korean Intellectual Property Office, Official Action dated Dec. 14, 2005, with respect to Korean Patent Application No. 2004-9090.

* cited by examiner

CYCLONE DUST COLLECTING APPARATUS FOR A VACUUM CLEANER

REFERENCE TO RELATED APPLICATION

This application claims priority to co-pending Korean Application No. 2004-09090, filed Feb. 11, 2004, in the Korean Intellectual Property Office, which is incorporated herein by reference in its entirety.

CROSS-REFERENCE TO RELATED APPLICATIONS

This application is related to copending applications entitled, "Cyclone Type Dust Collecting Apparatus for Vacuum Cleaner" (Korean Application No. 2003-33167, filed Oct. 10, 2003), "Cyclone Dust Collecting Apparatus for Vacuum Cleaner" (Korean Application No. 2003-67765, filed Sep. 30, 2003, and "Cyclone Dust Collecting Device and Vacuum Cleaner Having the same (Korean Application No. 2003, 32152, filed May 21, 2003) whose disclosures are commonly owned by the same assignee as the present applications and are entirely incorporated herein by reference.

FIELD OF THE INVENTION

The present invention relates to a vacuum cleaner. More particularly, the present invention relates to a cyclone dust collecting apparatus for a vacuum cleaner, which centrifuges dirt from drawn-in air.

BACKGROUND OF THE INVENTION

General vacuum cleaners, such as an upright-type or a canister-type vacuum cleaners, comprise a suction brush connected to a cleaner body that is movable along a cleaning surface. The inside of the cleaner body is provided with a dust collecting chamber having a detachable dust filter, and a motor chamber having a motor which generates a suction force. The motor generates a strong suction force at the suction brush. Air, including dust and dirt on the cleaning surface, is drawn into the cleaner body by the suction force. The drawn-in air passes through the dust filter in the dust collecting chamber of the cleaner body. The dust and dirt in the air are collected by the dust filter, and the cleaned air is discharged to the outside.

However, in the conventional vacuum cleaners when the dust filter is filled with dirt, a user must replace the dust filter. This is inconvenient and unhygienic for the user.

Taking this problem into account, a cyclone dust collecting apparatus has been developed with an improved dust collecting efficiency and that can be emptied when filled with dirt, and therefore eliminating the need to replace dust filter.

A cyclone dust collecting apparatus does not need a dust bag or the dust filter. However, some conventional cyclone dust collecting apparatuses fail to filter fine dust. Accordingly, the cyclone dust collecting apparatus having an enhanced dust collecting efficiency for filtering the fine dust is in need.

SUMMARY OF THE INVENTION

Accordingly, an object of the present invention is to provide a cyclone dust collecting apparatus for a vacuum cleaner, having an improved structure for better dust collecting efficiency of fine dust.

In order to achieve the above-described object of the present invention, a cyclone dust collecting apparatus for a vacuum cleaner is provided including a cyclone body having a first cyclone and a second cyclone, an air inlet and an air outlet connected to the cyclone body, and a dust receptacle connected to the cyclone body. The dust receptacle includes a receptacle body and a partition member which divides the inside of the dust receptacle into an upper and a lower dust collecting chambers.

According to an embodiment of the present invention, the lower dust collecting chamber is formed larger than the upper dust collecting chamber. The partition member is substantially shaped as an inverted dome, and slantingly mounted on an inner circumference of the receptacle body. At least one dust blocking rib and an air guide shaft may be formed in the lower dust collecting chamber. The receptacle body can be formed of a transparent material.

The cyclone body includes an outer wall defining an outline of the cyclone body, and an inner wall defining an outline of the first cyclone. The dust receptacle includes a first connection groove formed at an upper part of the receptacle body to receive a lower part of the outer wall, and a second connection groove is formed at an upper part of the partition member to receive a lower part of the inner wall. A first sealing is mounted in the first connection groove, and a second sealing is mounted in the second connection groove.

BRIEF DESCRIPTION OF THE DRAWING FIGURES

The above aspect and other features of the present invention will become more apparent by detailed description of the exemplary embodiments thereof with reference to the attached drawing figures.

DETAILED DESCRIPTION OF THE PREFERRED EMBODIMENT

Figure 1:
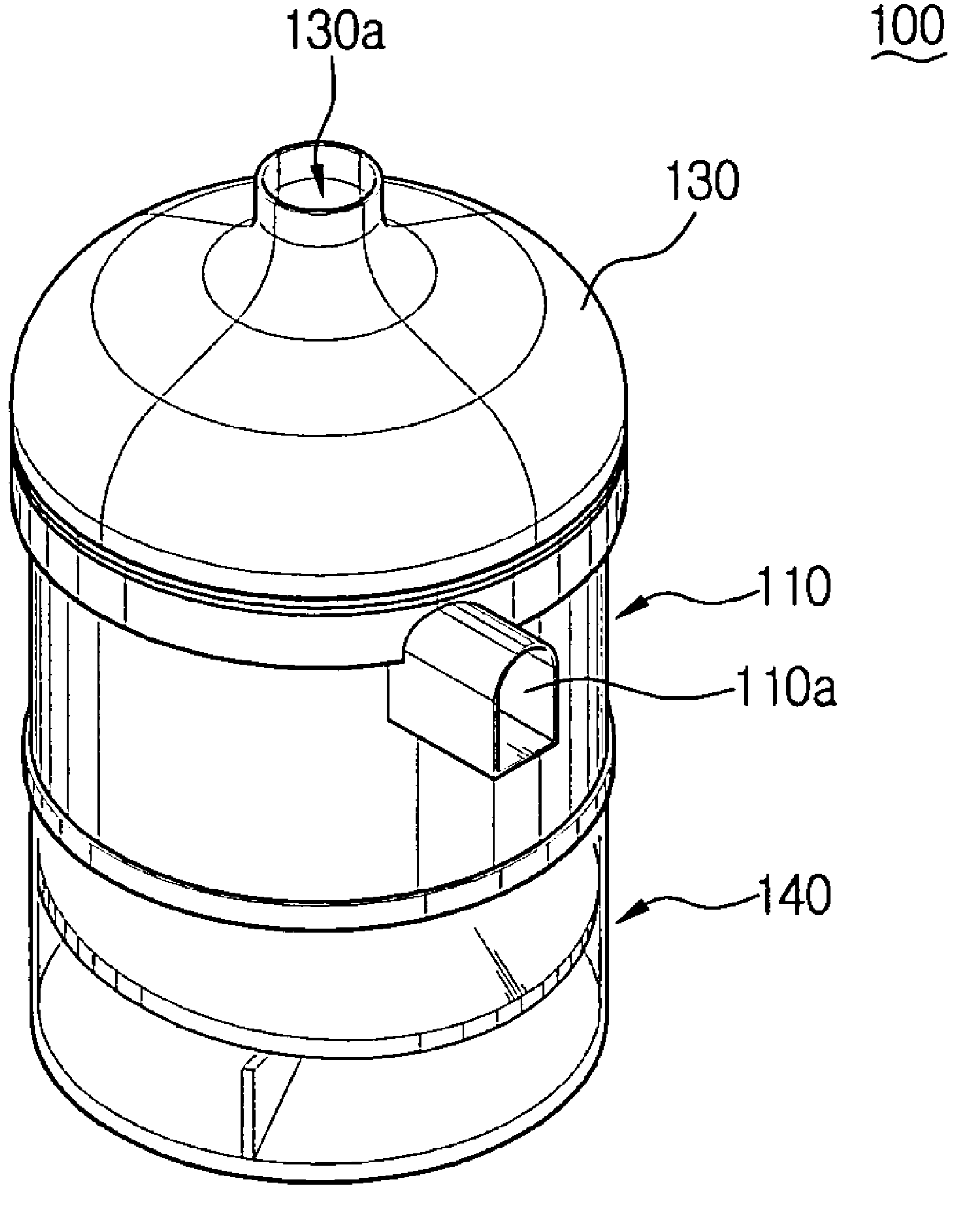
FIG. 1 is a perspective view of a cyclone dust collecting apparatus according to an embodiment of the present invention.
Figure 2:
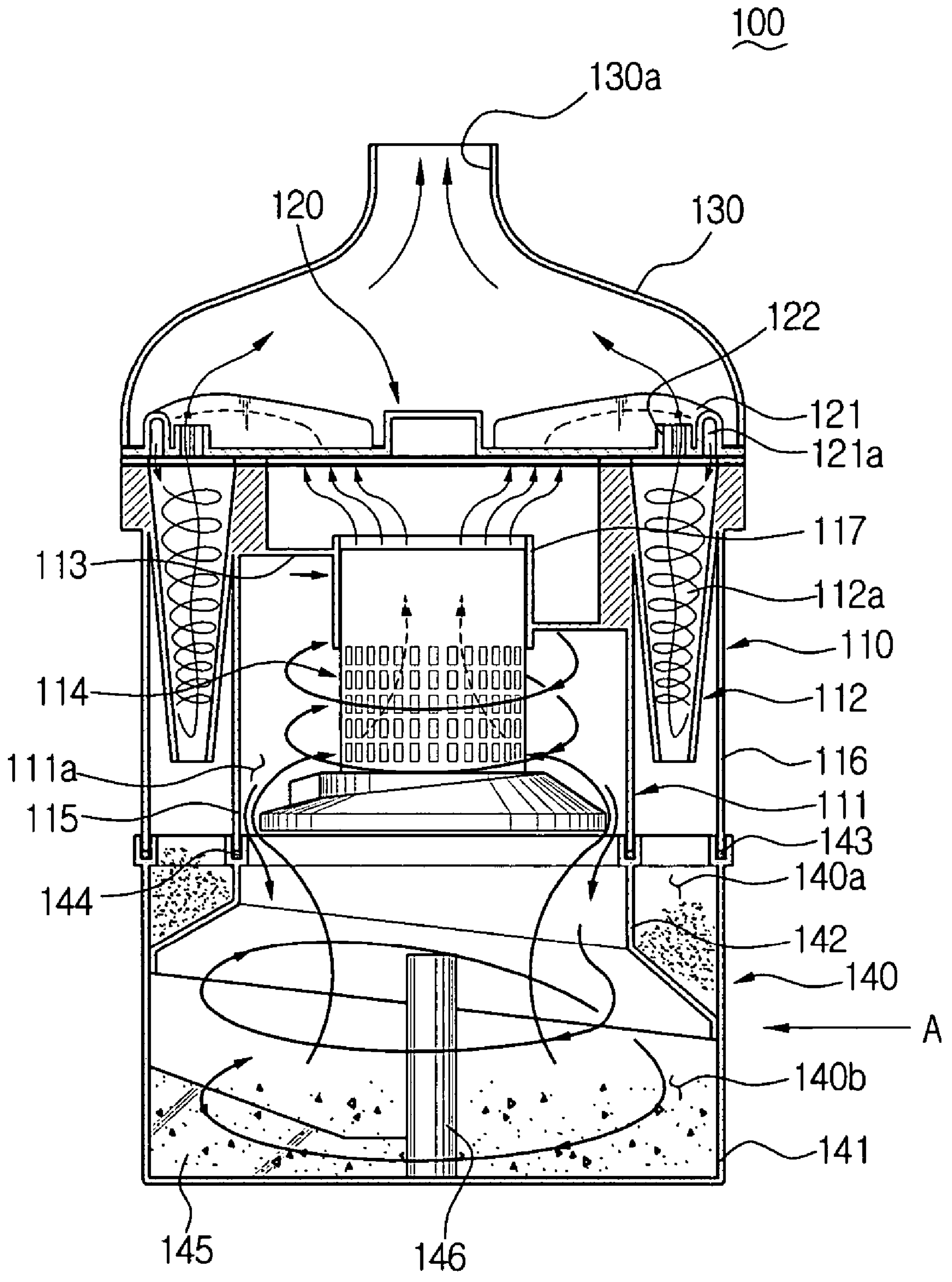
FIG. 2 is a sectional view of the cyclone dust collecting apparatus illustrated in FIG. 1.

As shown in FIGS. 1 and 2, a cyclone dust collecting apparatus 100 for a vacuum cleaner according to an embodiment of the present invention generally includes a cyclone body 110, a first and a second covers 120 and 130, and a dust receptacle 140.

The cyclone body 110 includes a first and second cyclones 111 and 112, an air inlet 110*a* (FIG. 1), a flow guide member 113, and a grill member 114. The first cyclone 111 separates dust from an air drawn into the cyclone body 110, and is disposed in the center of the cyclone body 110. The first cyclone 111 is defined by an inner wall 115 provided in the cyclone body 110, and a first chamber 111*a* is formed inside the first cyclone 111 to enable the drawn-in air to rotate therein.

The second cyclone 112 separates fine dust which is not separated from the air in the first chamber 111*a*, and has a second chamber 112*a* that allows the air to rotate therein. As shown in FIG. 2, more than one second cyclone 112 can be provided around the first cyclone 111. The second cyclone 112 has a substantially cone shape, which gradually decreases in section from the top toward the bottom, and is surrounded by an outer wall 116 defining the cyclone body 110.

The air inlet 110*a* is formed at one side of the cyclone body 110 to guide air into the cyclone body 110. When the cyclone dust collecting apparatus 100 is mounted to the vacuum cleaner, the air inlet 110*a* is connected to a suction pipe (not illustrated) of the vacuum cleaner.

The flow guide member 113 guides a whirling current of the air drawn in through the air inlet 110*a*, and is disposed at an upper part of the first cyclone 111 in the center of the cyclone body 110, as shown in FIG. 2. A connection pipe 117 is provided in the center of the flow guide member 113 as an air flow path within the first cyclone 111 to the second cyclone 112.

The grill member 114 is connected to the connection pipe 117 so as to be disposed inside the first chamber 111*a*. Air flows through the grill member 114 into the first chamber 111*a* toward the second cyclone 112. The grill member 117 blocks the dirt in the first chamber 111*a* from escaping therefrom.

The first cover 120 is connected to a top of the cyclone body 110, and has a path forming part 121 and a discharge pipe 122. The number of path forming parts 121 corresponds to the number of the second cyclones 112. In the path forming part 121, an air path 121*a* is formed for the discharge of air from the first chamber 111*a* to the second chamber 112*a*. The discharge pipe 122 offers a path for the air in the second chamber 112*a* to the outside of the second chamber 112*a*.

The second cover 130 has an air outlet 130*a* and covers an upper part of the first cover 120. When the cyclone dust collecting apparatus 100 is mounted to the vacuum cleaner, the air outlet 130*a* is connected to the motor chamber (not illustrated) of the vacuum cleaner.

The dust receptacle 140 is provided to collect the dust and dirt separated from the air by the first and the second cyclones 111 and 112, and connected to a lower part of the cyclone body 110. The dust receptacle 140 includes a receptacle body 141 and a partition member 142. The partition member 142 is slantingly mounted on an inner circumference of the receptacle body 141 to divide the inner space of the receptacle body 141 into an upper dust collecting chamber 140*a* and a lower dust collecting chamber 140*b*. In the lower dust collecting chamber 140*b*, dust is separated from the air and collected by the first cyclone 111. In the upper dust collecting chamber 140*a*, fine dust is separated from the air and collected by the second cyclones 112. The lower dust collecting chamber 140*b* is larger than the upper dust collecting chamber 140*a* since collecting of larger dust requires a larger space than collecting fine dust. As shown in FIG. 2, the partition member 142 substantially has a shape of an inverted dome so as to advantageously design the lower dust collecting chamber 140*b* to be larger than the upper dust collecting chamber 140*a*. The inverted dome shape also facilitates cleaning of the dust receptacle 140 in removing the dust collected in the lower dust collecting chamber 140*b*.

Figure 3:
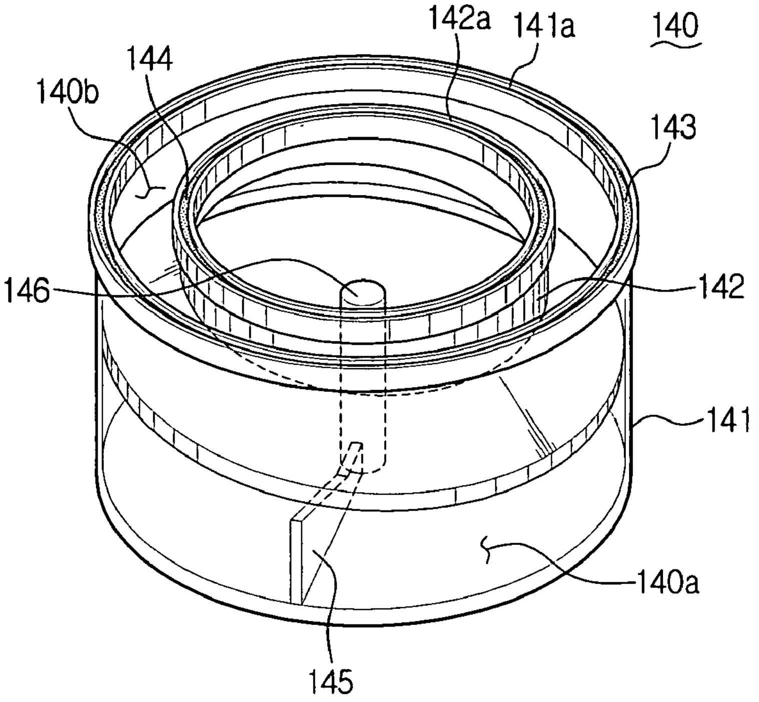
FIGS. 3 and 4 are a perspective view and a plan view, respectively, showing a dust receptacle of the cyclone dust collecting apparatus of FIG. 1 according to an embodiment of the present invention.

As shown in FIG. 3, a first connection groove 141*a* is formed at an upper part of the receptacle body 141, and a second connection groove 142*a* is formed at an upper part of the partition member 142. Inside the connection grooves 141*a* and 142*a*, a first sealing 143 and a second sealing 144 are provided, respectively. As shown in FIG. 2, when the dust receptacle 140 is connected to the cyclone body 110, a lower part of the outer wall 116 of the cyclone body 110 is inserted in the first connection groove 141*a*, and a lower part of the inner wall 115 of the cyclone body 110 is inserted in the second connection groove 142*a*. Therefore, the first chamber 111*a* and the lower dust collecting chamber 140*b* constitute an independent space for the large dust separated from the air to be collected, and the second chambers 112*a* and the upper dust collecting chamber 140*a* constitute another independent space for the fine dust separated from the air to be collected.

Figure 4:
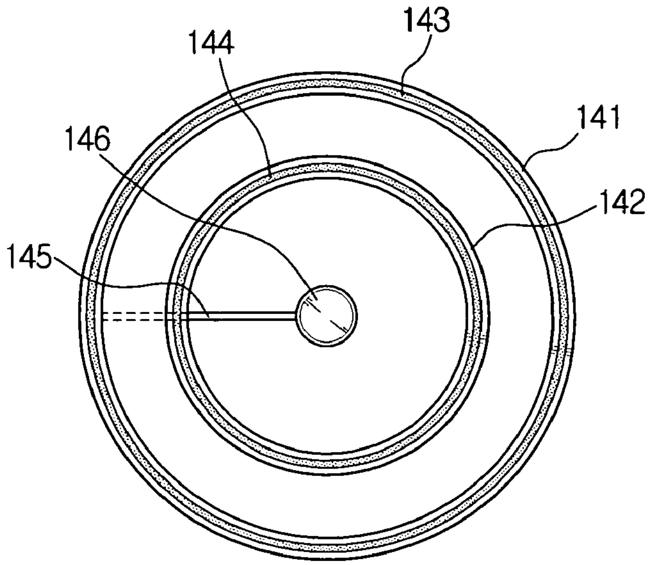
Figure 5:
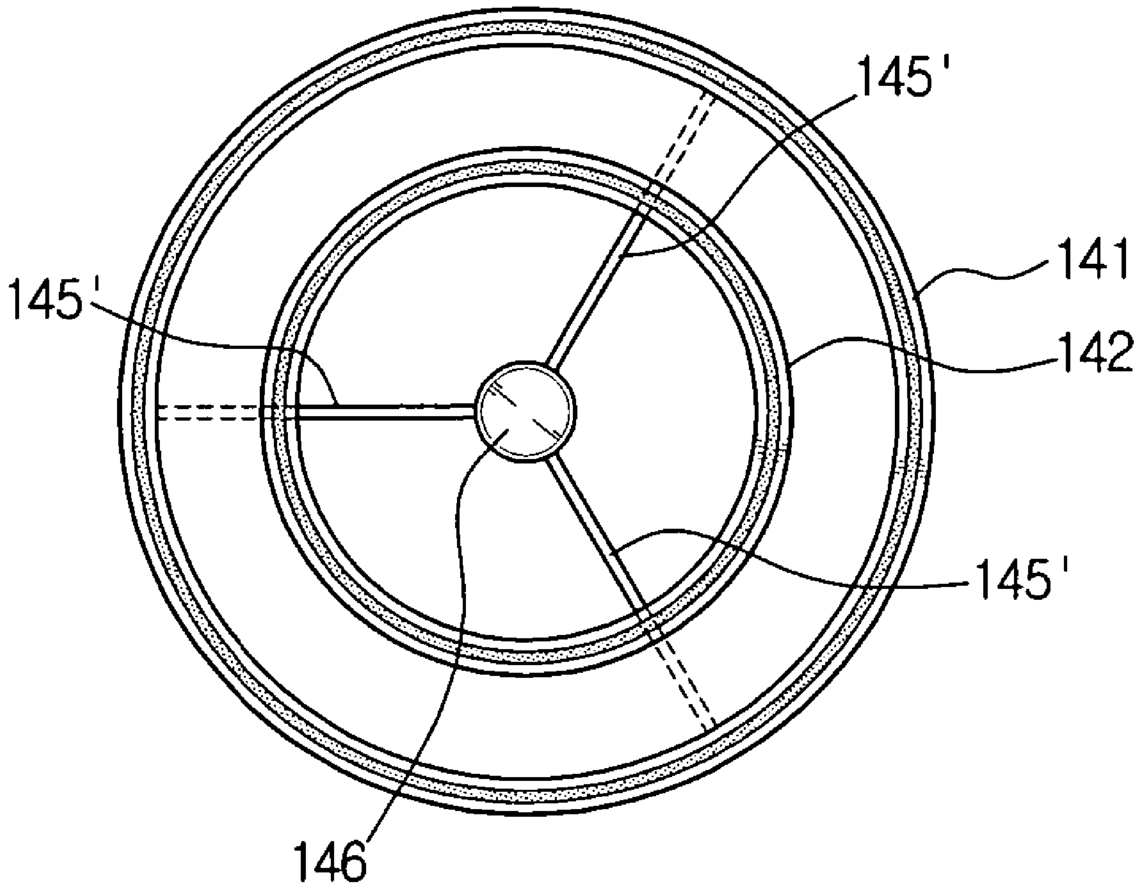
FIG. 5 is a plan view of a dust receptacle according to another embodiment of the present invention.

As shown in FIGS. 2-4, a dust blocking rib 145 and an air guide shaft 146 may be mounted in the lower dust collecting chamber 140*b*. The dust blocking rib 145 prevents the dust in the lower dust collecting chamber 140*b* from flowing by a whirling air current. A single dust blocking rib 145 may be formed on a bottom of the lower dust collecting chamber 140*b*. However, the number of the dust blocking rib 145 is not limited to one. Referring to FIG. 5, three dust blocking ribs 145' may be formed around the air guide shaft 146. Although three ribs 145' are shown, any number of the dust blocking ribs 145, such as two or four, can be provided. The air guide shaft 146 is disposed substantially at the center of the lower dust collecting chamber 140*b* to facilitate flow of the air current flowing into the first chamber 111*a*. More specifically, the air flowing in the lower dust collecting chamber 140*b* rotates with respect to the air guide shaft 146.

The receptacle body 141 can be formed of a transparent material allowing a user to observe and check the amount of dust collected in the dust receptacle 140 without separating the dust receptacle 140 from the vacuum cleaner. The cyclone dust collecting apparatus 100 can be mounted to the vacuum cleaner so that it may be seen by the user from direction A, as shown in FIG. 2. Since the partition member 142 is slanted, view of the lower dust collecting chamber 140*b* is blocked when observed from direction A. Therefore, the user does not have to view the unpleasant dust in the lower dust collecting chamber 140*b*.

Hereinbelow, the operation of the cyclone dust collecting apparatus 100 for the vacuum cleaner according to embodiments of the present invention will be described with reference to FIG. 2. Air is drawn in through the air inlet 110*a* (FIG. 1), rotates in the first chamber 111*a*, and flows downward along the flow guide member 113. Larger dust included in the air is separated from the air by a centrifugal force, and drops to the lower dust collecting chamber 140*b*. The whirling air current that descended from the first chamber 111*a* toward the lower dust collecting chamber 140*b* ascends as it hits the bottom, through a center of the first chamber 111*a* and escapes from the first chamber 111*a* through the grill member 114.

The air escaping from the first chamber 111*a* flows into the second chamber 112*a* of the second cyclone 112 through the air path 121*a* of the first cover 120. The air in the second chamber 112*a* descends, rotates along an inner wall of the second cyclone 112, and as it hits the bottom, ascends through a center of the second chamber 112*a*. At this time, the fine dust in the air is centrifuged, and the separated fine dust is collected in the upper dust collecting chamber 140*a* of the dust receptacle 140.

The air that ascended through the center of the second chamber 112*a* is discharged from the second chamber 112*a* through the discharge pipe 122, and is discharged to the outside of the cyclone dust collecting apparatus 100 through the air outlet 130*a* of the second cover 130.

According to a few embodiments of the present invention as described above, the large dust in the drawn-in air is centrifuged in the first cyclone 111 and collected in the lower dust collecting chamber 140*b* of the dust receptacle 140. The fine dust in the air is centrifuged in the second cyclone 112 and collected in the upper dust collecting chamber 140*a* of the dust receptacle 140. Accordingly, a cyclone dust collecting apparatus 100, which is able to centrifuge and collect the fine dust as well as the large dust, can be implemented.

As can be appreciated from the above description, since the dust receptacle 140 is designed in such a manner that the lower dust collecting chamber 140*b* is larger than the upper dust collecting chamber 140*a*, so that the inner space of the dust receptacle 140 is effectively utilized.

While the invention has been shown and described with reference to certain embodiments thereof, it will be understood by those skilled in the art that various changes in form and details may be made therein without departing from the spirit and scope of the invention.

What is claimed is:

1. A cyclone dust collecting apparatus for a vacuum cleaner, comprising:

a cyclone body having a first cyclone, and a plurality of second cyclones formed around the first cyclone in fluid communication with the first cyclone;

an air inlet connected to the cyclone body to allow air to flow into the cyclone body;

an air outlet connected to the cyclone body to discharge the air passed through the respective cyclones; and a dust receptacle connected to the cyclone body to collect dirt separated from the air by the first and second cyclones, wherein the dust receptacle includes a receptacle body and a partition member provided in an inner circumference of the receptacle body to divide the inside of the dust receptacle into upper and lower dust collecting chambers, the partition member being slantingly mounted on the inner circumference of the receptacle body.

2. The cyclone dust collecting apparatus of claim 1, wherein the lower dust collecting chamber is larger than the upper dust collecting chamber.

3. The cyclone dust collecting apparatus of claim 1, wherein the partition member is substantially shaped as an inverted dome.

4. The cyclone dust collecting apparatus of claim 1, wherein at least one dust blocking rib is formed in the lower dust collecting chamber.

5. The cyclone dust collecting apparatus of claim 1, wherein an air guide shaft is formed in the lower dust collecting chamber.

6. The cyclone dust collecting apparatus of claim 1, wherein the receptacle body is formed of a transparent material.

7. The cyclone dust collecting apparatus of claim 1, wherein the cyclone body includes an outer wall defining a perimeter of the cyclone body, and an inner wall defining a perimeter of the first cyclone, and the dust receptacle includes a first connection groove formed at an upper part of the receptacle body to receive a lower part of the outer wall, and a second connection groove formed at an upper part of the partition member to receive a lower part of the inner wall.

8. The cyclone dust collecting apparatus of claim 7, wherein a first sealing is mounted in the first connection groove, and a second sealing is mounted in the second connection groove.

9. A cyclone dust collecting apparatus for a vacuum cleaner, comprising:

a cyclone body having a first cyclone, and a plurality of second cyclones formed around the first cyclone in fluid communication with the first cyclone;

an air inlet connected to the cyclone body to allow air to flow into the cyclone body;

an air outlet connected to the cyclone body to discharge the air passed through the respective cyclones; and a dust receptacle connected to the cyclone body to collect dirt separated from the air by the first and second cyclones, wherein the dust receptacle includes a receptacle body and a partition member provided in an inner circumference of the receptacle body to divide the inside of the dust receptacle into upper and lower dust collecting chambers, and at least one dust blocking rib being formed in the lower dust collecting chamber.

10. A cyclone dust collecting apparatus for a vacuum cleaner, comprising:

a cyclone body having a first cyclone, and a plurality of second cyclones formed around the first cyclone in fluid communication with the first cyclone;

an air inlet connected to the cyclone body to allow air to flow into the cyclone body;

an air outlet connected to the cyclone body to discharge the air passed through the respective cyclones; and a dust receptacle connected to the cyclone body to collect dirt separated from the air by the first and second cyclones, wherein the dust receptacle includes a receptacle body and a partition member provided in an inner circumference of the receptacle body to divide the inside of the dust receptacle into upper and lower dust collecting chambers, and an air guide shaft being formed in the lower dust collecting chamber.

* * * * *